:::: {.columns}
3,773,875
METHOD OF MAKING FOAMED ARTICLES HAVING A REINFORCING MEMBER Peter C. Lammers, Doylestown, Ohio, assignor to The Goodyear Tire & Rubber Company, Akron, Ohio
Filed Apr. 1, 1968, Ser. No. 717,544
Int. Cl. B29d 27/04
U.S. Cl. 264—45                                2 Claims

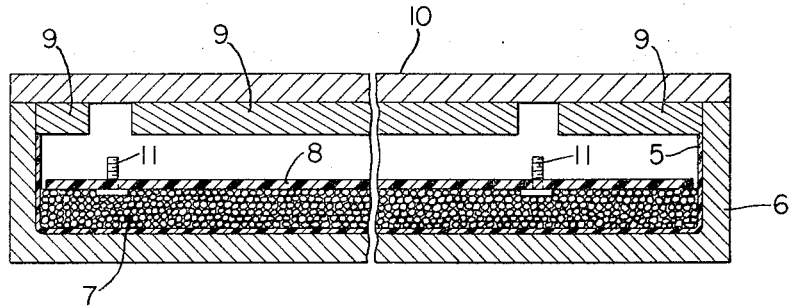
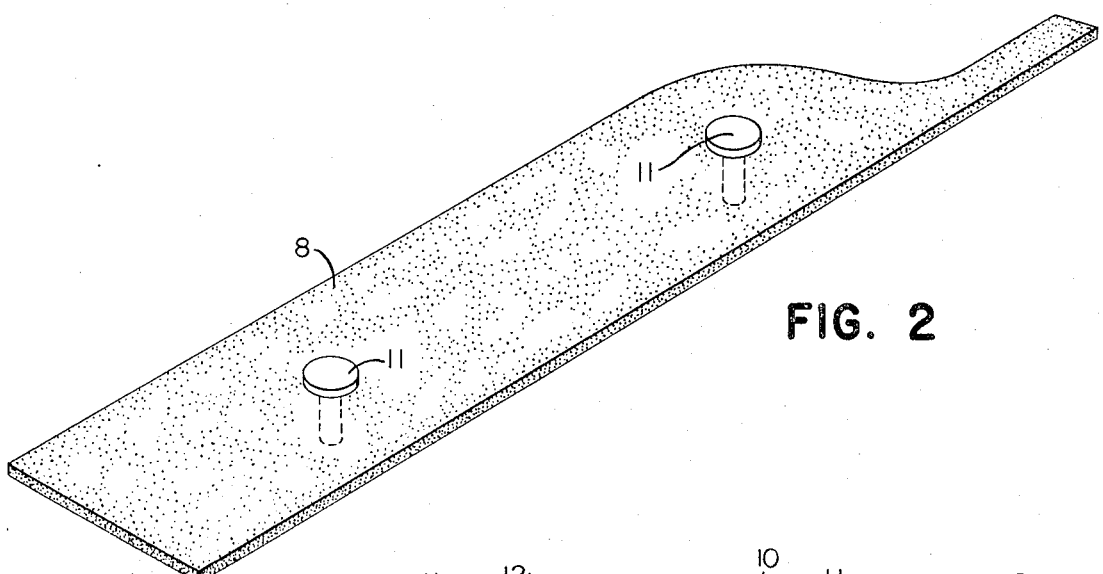
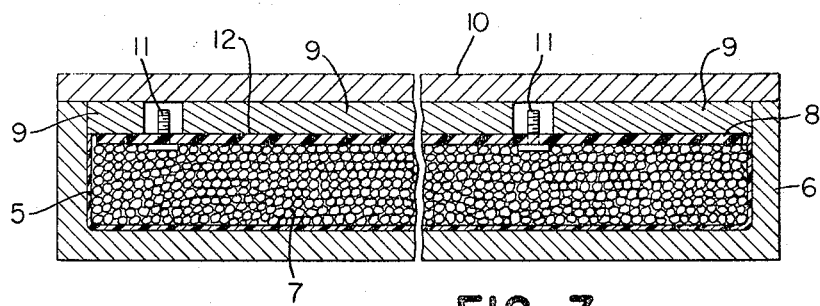
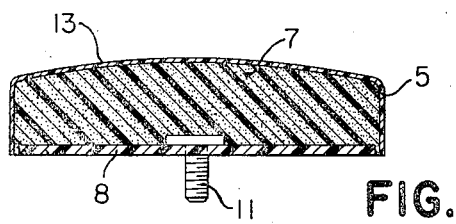

ABSTRACT OF THE DISCLOSURE

This invention relates to a method of making foamed articles having a reinforcing member by foaming a foamable material in a mold cavity and floating the reinforcing members upward to the desired position and retaining them there until the foam is set, the foaming occurring either in the presence of a preformed skin or under conditions to form an integral skin.

---

This invention relates to a method of making decorative articles having a flexible foam interior and to said article. More particularly, this invention relates to a method of making interior articles or decorative elements for automobiles and other vehicles, furniture and other related equipment or assemblies having a skin thereon and a means for attaching the article to an assembly.

Heretofore in the preparation of skin covered foamed articles such as the interior or decorative elements of an automobile or furniture and other related equipment or assemblies, it has been customary to place the reinforcing and attaching means in the mold and then lock the mold with the attaching member held in a fixed position with magnets or related attaching means. This has presented the problem of timing the mold closing and also a method of attaching the reinforcing and attaching member to the mold where it could be readily released. Where the element is resinous or plastic in nature magnets are not effective to hold the element.

Therefore, an object of this invention is to provide a method for positioning the reinforcing and attaching member whereby the member becomes automatically positioned without having to be fixed to the mold parts.

The nature of this invention may be more readily understood by reference to the drawings wherein FIG. 1 is a cross-sectional view through a mold having a lid resting thereon showing the reinforcing and attaching member floating on the foamable mixture as the foam rises.

FIG. 2 is a perspective view of a typical reinforcing and attaching member for automobile A-post elements.

FIG. 3 is a cross-sectional view through the mold and lid showing the reinforcing and attaching member in contact with the stop means.

FIG. 4 is a cross-section through the finished article showing the foam having the skin thereon with the reinforcing and attaching member incorporated therein as an integral part of the resulting article.

The objects and advantages of this invention can be obtained by placing a suitable skin 5 such as a vinyl or polyurethane one within the retaining mold 6, supplying a suitable foamable mixture 7 in amounts sufficient to fill the mold to the desired level and then placing the reinforcing and attaching member 8 on the rising foam where it will float upward to contact the stop means 9 of the lid 10. The stop means will hold the reinforcing and attaching member 8 in the desired position until the foam is set and cured and then the mold may be opened to obtain the finished article such as that shown in cross-section in FIG. 4.

Referring more particularly to the drawings, the numeral 5 represents the skin of the article which may contain the desired decorative effect such as a simulated sewn seam or embossing or related aesthetic embellishments to give the skin the effect of fabric, leather or other desirable appearance effect. The skin may be formed by any of the conventional means such as vacuum forming of any of the thermoplastic resinous films which have embossed thereon the desired decorative effects. Alternately, the skin 5 may be formed by slush molding or rotatinal molding or other molding techniques or even made by spraying a suitable film forming material into a mold and curing to set it where the skin will retain the desired contour. The skin is placed in a suitable retaining mold or it may remain in the mold in which it was formed and then a suitable foamable material is added to the cavity of the skin, the amount added is preferably just sufficient to foam and fill the skin when the skin has placed therein a reinforcing member 8. The reinforcing member 8 preferably has also means 11 such as a bolt or grommets for attaching the finished article to the final assembly, for instance, to the upright or side of the interior of an automobile. The foaming of the foamable material is initiated slightly before the reinforcing member 8 is placed in the mold or shortly thereafter and as the foamable material foams it will tend to force the reinforcing member 8 to rise. It is desirable that the upward rise or floating of the reinforcing member 8 be limited to position the reinforcing member in the position 12 best seen in FIG. 3. Thus, when the foaming of the foamable material is completed the skin will be filled with a foam which will be adhered to the skin and also be adhered to the reinforcing member 8. Thus, we obtain the finished article shown best by numeral 13 of FIG. 4.

Thus, when the foam of the finished article has been fully cured the article may be removed from the mold when the lid is opened and is ready to be attached to the finished assembly. For instance, where the finished assembly is an automobile and the decorative article is for an A-post of the automobile, the attaching means 11 would be placed within the proper receptacles within the door A-post to attach the article to the automobile and thus achieve the proper decoration of the interior of the car with a corresponding improvement in safety.

Preferably the skin is made from a thermoplastic or setting material such as polyvinyl chloride, an acrylonitrile-butadiene-styrene graft polymer or it may be polyurethane or any of the other suitable thermoset resins that are normally used in making skins for cars, cushions, crash pads and related articles.

The reinforcing member 8 may be made by pouring a rigid or semi-rigid foam within a mold which is at least slightly smaller than the interior cavity of the skin and then effecting foaming of the desired foaming material to obtain a reinforcing member having one surface which is essentially nonporous, although the surface, if desired, may be of essentially the same porosity from top to bottom. It is desired that suitable attaching means such as screws, nuts or grommets be positioned at the appropriate place in the mold and thus these attaching means become an intergral part of the finished reinforcing member. It should be evident that a semi-rigid or rigid polyurethane would be excellent for the preparation of this reinforcing member, although it should be appreciated that other foamable materials such as polyethylene, polypropylene, polyvinylchloride, polystyrene and related resinous or rubbery materials could be utilized. The preferred foam is one that has sufficient resistance to tearing that the attaching means are not easily torn out. These foams are sometimes referred to as nailable foams and are relatively heavily loaded with fillers, for instance, 25 to 100 parts per 100 parts of resin.

The foamable material utilized to produce the foam which adheres the skin to the reinforcing member is preferably of a flexible or semi-flexible nature rather than being a rigid foam and these foamable materials may be any of those well known to the art but preferably is a polyurethane such as those that are normally used in making seat cushions or crash pads for the automobile industry.

Suprisingly, a finished article such as an A-post element which utilizes a rigid foam reinforcing member instead of a conventional sheet metal stamping is capable of undergoing severe deflection without permanently bending, twisting or otherwise distorting.

Illustrative of this invention is the following example:

A decorative skin was formed by spraying a polyurethane reaction mixture onto an embossed mold and cured. This skin had the physical contour of that shown in FIG. 4. A foamable polyurethane mixture was added thereto in an amount sufficient to fill the cavity of the skin when the foaming was complete. This foamable mixture comprised a mixture of polypropylene ether glycol and polypropylene ether triol, toluene diisocyanate, a small amount of water and dichlorofluoroethane and catalyst N-ethyl morpholine and triethyline diamine, then a preformed reinforcing and attaching member 8 was positioned on the foam of the foaming mixture in the manner shown in FIG. 1, then the lid was closed and the foamable reaction mixture was allowed to continue to foam and thus float the reinforcing and attaching means upward until it came in contact with the stop means 9. With the reinforcing and attaching means 8 in contact with the stop means 9 the foamed article will be sealed around the edges of the skin to give it a suitable utilitarian advantage and also a nice appearance as may be seen from the cross sectional view of the article shown in FIG. 4. The foam is allowed to set and cure in contact with the skin and the reinforcing and attaching member to give an article integrated into a satisfactory decorative and useful article.

The reinforcing and attaching member is preferably made from a semi-rigid to rigid foam, although a flexible to rigid plastic could be used in some instances. The preferred material for making this reinforcing member is a polyurethane foamable mixture comprising a mixture of polypropylene ether triol and polypropylene ether tetrol with a small amount of a trifunctional monomeric crosslinker such as trimethylol propane which is reacted with an isocyanate such as toluene diisocyanate or a polyphenylene methane polyisocyanate in the presence of a blowing agent such as water and methylene chloride or a fluorocarbon. To insure that the rigid or semi-rigid foam has sufficient resistance to tearing it is preferred that this foamable recipe contains on a hundred parts of polyether-polyol basis from about 25–50 parts of a cellulosic material such as sawdust or nutshell flours. As the reinforcing and attaching means is made by pouring a suitable mixture into a suitable mold it is preferred that suitable attaching means such as bolts or grommets are positioned within the mold and embedded within the rigid foam member to give a reinforcing and attaching means which has embedded therein and forming an integral part thereof suitable attaching means such as bolts or grommets.

Heretofore in this application we have discussed the fact that a preformed skin is placed in the mold and then the foam is foamed to form the desired article. Alternately, the skin may be formed by the well-known techniques of cooling the mold or having the temperature of the mold below that of the foaming mixture whereby an integral skin is formed simultaneously with the generation of the foamed core or body of the article. The techniques for forming integral skins is described in U.S. Pat. 3,099,516 and this method and others known to the art may be utilized to form integral skins simultaneously with the formation of the article.

While certain representative embodiments and details have been shown for the purpose of illustrating the invention, it will be apparent to those skilled in this art that various changes and modifications may be made therein without departing from the spirit or scope of the invention.

What is claimed is:

1. A method of making a skin-covered element for equipment comprising
    (1) forming a thermoplastic skin selected from the class consisting of polyvinyl chloride, acrylonitrile-butadiene-styrene graft polymers and polyurethane, along the bottom and sides of a mold cavity,
    (2) adding sufficient resinous or rubbery foamable material, selected from the class consisting of polyurethane, to fill the skin while the skin is retained in a retaining mold,
    (3) placing a reinforcing member adapted to float on the rising polyurethane foam within the confines of the skin lined mold cavity and upon the foam being generated by the foamable material, and
    (4) allowing the foamable mixture to foam to move the said reinforcing member upward to the desired position where a stop means retains the member against further movement while the foamable material foams and sets.

2. The method of claim 1 wherein the reinforcing member has attaching means connected therewith.

References Cited

UNITED STATES PATENTS

| | | | |
|---|---|---|---|
| 2,394,327 | 2/1946 | Niessen et al. | 264—45 |
| 2,694,871 | 11/1954 | Rollman | 264—45 X |
| 2,955,972 | 10/1960 | Wintermute et al. | 264—45 X |
| 3,542,900 | 11/1970 | Lammers | 249—134 X |
| 3,110,938 | 11/1963 | Beck et al. | 264—45 |
| 3,273,179 | 9/1966 | Ridenour | 264—45 |
| 3,390,214 | 6/1968 | Woods | 264—45 |
| 2,764,516 | 9/1956 | Pace | 264—45 |
| 3,041,224 | 6/1962 | Saerts et tal. | 264—45 X |
| 3,099,516 | 6/1963 | Henrickson | 264—Dig. 14 |

FOREIGN PATENTS

| | | | |
|---|---|---|---|
| 737,834 | 7/1966 | Canada | 264—48 |
| 873,518 | 7/1961 | Great Britain | 264—45 |

PHILIP E. ANDERSON, Primary Examiner

U.S. Cl. X.R.

161—161; 249—83, 121; 264—255, 269; 297—1, 412